(12) United States Patent  
Wang et al.

(10) Patent No.: US 9,178,446 B2  
(45) Date of Patent: Nov. 3, 2015

(54) TRIBOELECTRIC GENERATOR

(75) Inventors: Zhong L. Wang, Marietta, GA (US); Fengru Fan, Atlanta, GA (US); Long Lin, Atlanta, GA (US); Guang Zhu, Atlanta, GA (US); Caofeng Pan, Atlanta, GA (US); Yusheng Zhou, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 390 days.

(21) Appl. No.: 13/598,132

(22) Filed: Aug. 29, 2012

(65) Prior Publication Data

US 2013/0049531 A1  Feb. 28, 2013

Related U.S. Application Data

(60) Provisional application No. 61/528,981, filed on Aug. 30, 2011, provisional application No. 61/621,114, filed on Apr. 6, 2012.

(51) Int. Cl.  
*H02N 1/04* (2006.01)

(52) U.S. Cl.  
CPC ........................................ *H02N 1/04* (2013.01)

(58) Field of Classification Search  
CPC ............. H02N 1/04; H02N 1/06; H02N 1/08; H02N 1/10; H02N 1/12; H02N 1/00  
USPC .................. 310/308–310, 300; 322/2 A, 2 R  
See application file for complete search history.

(56) References Cited

U.S. PATENT DOCUMENTS

| 4,126,822 A | 11/1978 | Wahlstrom |
| 4,990,813 A | 2/1991 | Paramo |
| 8,536,760 B1 * | 9/2013 | Kim et al. ..................... 310/310 |
| 2005/0048293 A1 * | 3/2005 | Rood ............................ 428/429 |

(Continued)

FOREIGN PATENT DOCUMENTS

DE  4429029 A1 *  2/1996  ............... H02N 1/04

OTHER PUBLICATIONS

Post et al., "Electrostatic Power Harvesting for Material Computing", Pers Ubiquit Comput, No. 15, Aug. 10, 2010, pp. 115-121.*

(Continued)

*Primary Examiner* — Quyen Leung  
*Assistant Examiner* — Eric Johnson  
(74) *Attorney, Agent, or Firm* — Bryan W. Bockhop; Bockhop & Associates, LLC

(57) ABSTRACT

A generator includes a thin first contact charging layer and a thin second contact charging layer. The thin first contact charging layer includes a first material that has a first rating on a triboelectric series. The thin first contact charging layer has a first side with a first conductive electrode applied thereto and an opposite second side. The thin second contact charging layer includes a second material that has a second rating on a triboelectric series that is more negative than the first rating. The thin first contact charging layer has a first side with a first conductive electrode applied thereto and an opposite second side. The thin second contact charging layer is disposed adjacent to the first contact charging layer so that the second side of the second contact charging layer is in contact with the second side of the first contact charging layer.

13 Claims, 5 Drawing Sheets

(56) References Cited

U.S. PATENT DOCUMENTS

| | | |
|---|---|---|
| 2006/0064826 A1 | 3/2006 | Kimball |
| 2006/0280322 A1* | 12/2006 | Abe ............................. 381/300 |
| 2008/0036038 A1* | 2/2008 | Hersee et al. ................. 257/615 |
| 2008/0138602 A1* | 6/2008 | Canham et al. .......... 428/311.11 |
| 2009/0130588 A1* | 5/2009 | Veregin et al. ................ 430/113 |
| 2010/0133006 A1 | 6/2010 | Shakra et al. |
| 2011/0050181 A1 | 3/2011 | Post et al. |

OTHER PUBLICATIONS

ISA: "Notification of Transmittal of the International Search Report and the Written Opinion of the International Searching Authority, or the Declaration"; WIPO Feb. 22, 2013.

* cited by examiner

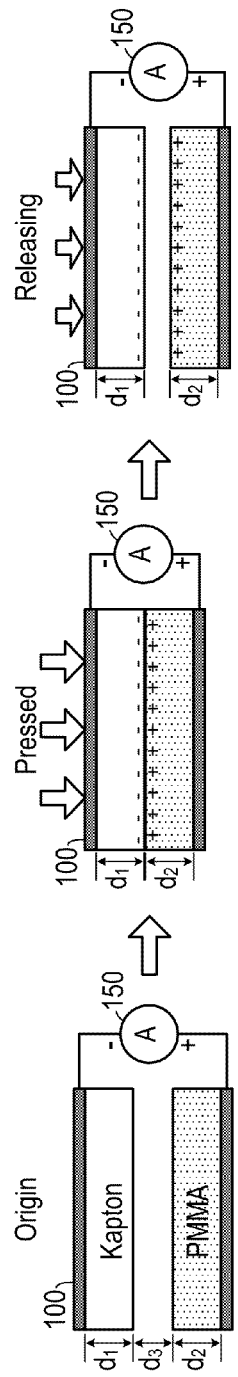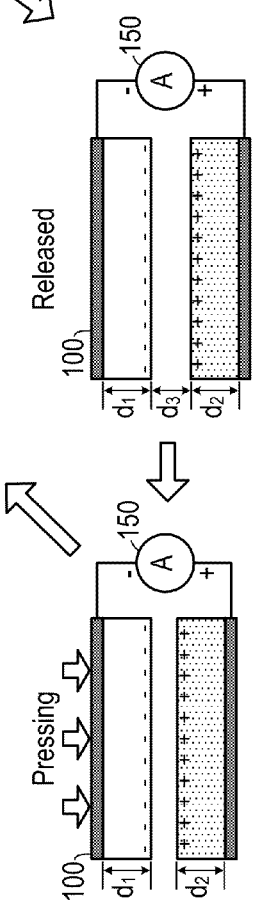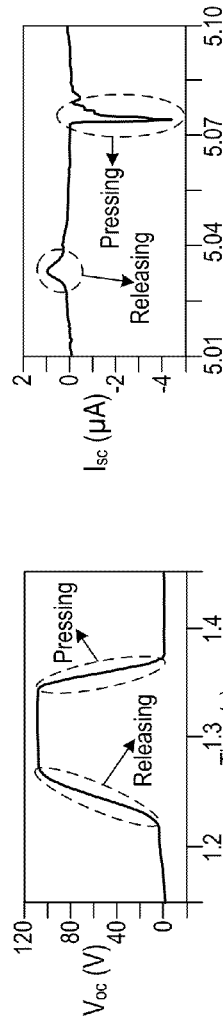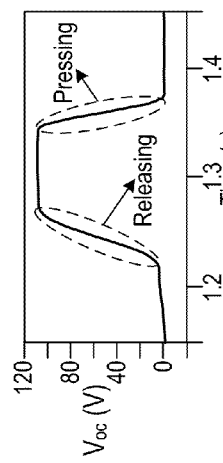

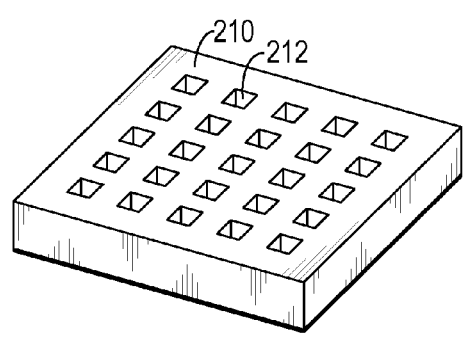
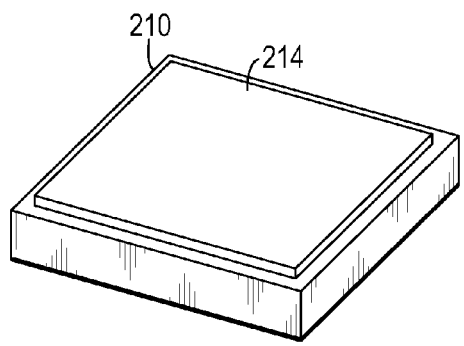
FIG. 4A  FIG. 4B
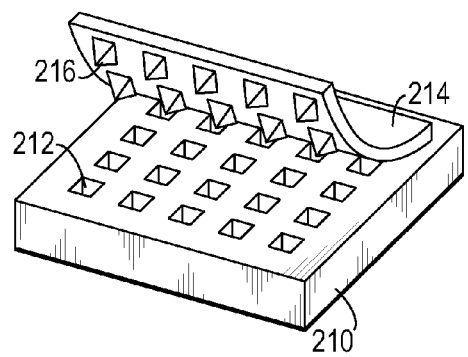
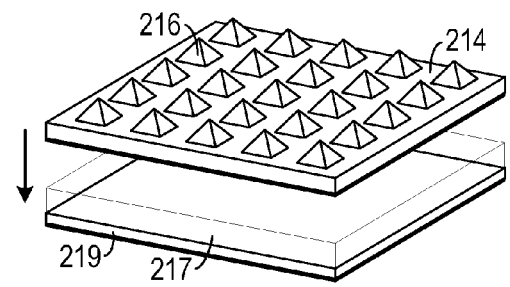
FIG. 4C  FIG. 4D
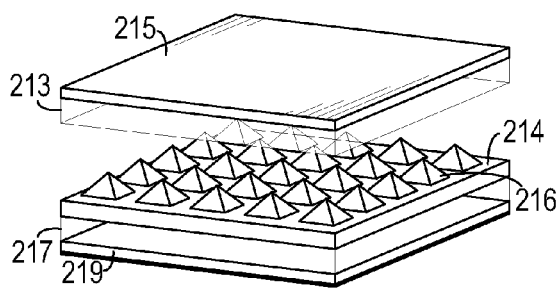
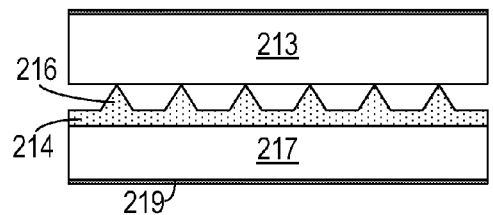
FIG. 4E  FIG. 5

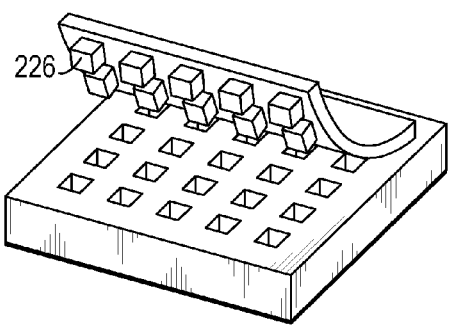
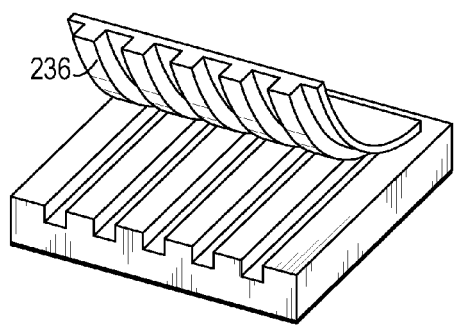
FIG. 6A    FIG. 6B
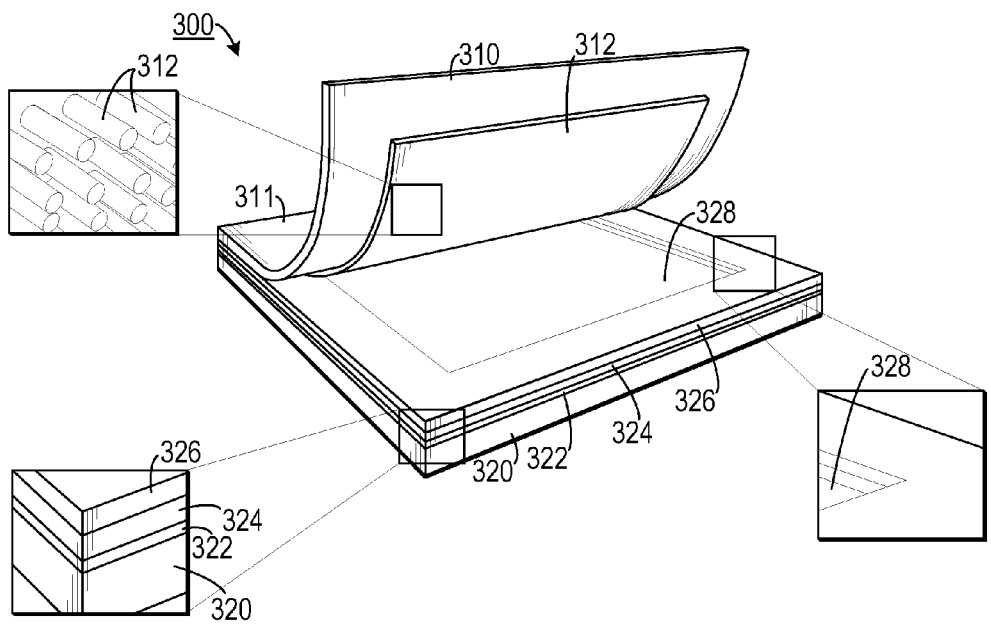
FIG. 7

TRIBOELECTRIC GENERATOR

CROSS-REFERENCE TO RELATED APPLICATION(S)

This application claims the benefit of U.S. Provisional Patent Application Ser. No. 61/528,981, filed Aug. 30, 2011, the entirety of which is hereby incorporated herein by reference. This application also claims the benefit of U.S. Provisional Patent Application Ser. No. 61/621,114, filed Apr. 6, 2012, the entirety of which is hereby incorporated herein by reference.

STATEMENT OF GOVERNMENT INTEREST

This invention was made with government support under agreement No. DE-FG02-07ER46394, awarded by the Department of Energy. The government has certain rights in the invention.

BACKGROUND OF THE INVENTION

1. Field of the Invention

The present invention relates to generators and, more specifically, to a system for generating voltage and current using the triboelectric effect.

2. Description of the Related Art

Energy harvesting by converting ambient energy into electricity may offset the reliance of small portable electronics on traditional power supplies, such as batteries. When long-term operation of a large number of electronic devices in dispersed locations is required, energy harvesting has the advantages of outstanding longevity, relatively little maintenance, minimal disposal and contamination. Despite of these benefits, superior performance, miniaturized size and competitive prices are still to be sought after in order for energy harvesting technology becoming prevalent.

The triboelectric effect is a type of contact electrification in which certain materials become electrically charged after they come into contact with another such as through friction. It is the mechanism though which static electricity is generated. Triboelectric effect associated electrostatic phenomena are the most common electrical phenomena in our daily life, from walking to driving, but the triboelectric effect has been largely ignored as an energy source for electricity. Some electrostatic microgenerators have been developed and used in research relating to microelectromechanical systems (MEMS), but such designs tend to be based on inorganic materials and the fabrication of such devices requires complex processes.

Therefore, there is a need for a reliable, small and easily manufactured system for harvesting triboelectric energy.

SUMMARY OF THE INVENTION

The disadvantages of the prior art are overcome by the present invention which, in one aspect, is a generator that includes a thin first contact charging layer and a thin second contact charging layer. The thin first contact charging layer includes a first material that has a first rating on a triboelectric series. The thin first contact charging layer has a first side with a first conductive electrode applied thereto and an opposite second side. The thin second contact charging layer includes a second material that has a second rating on a triboelectric series that is more negative than the first rating. The thin first contact charging layer has a first side with a first conductive electrode applied thereto and an opposite second side. The thin second contact charging layer is disposed adjacent to the first contact charging layer so that the second side of the second contact charging layer is in contact with the second side of the first contact charging layer.

In another aspect, the invention is a triboelectric generator that includes a first conductive electrode layer, a second conductive electrode layer, a first contact charging layer and a second contact charging layer. The first contact charging layer has a first side and an opposite second side. The first conductive electrode layer is disposed on the first side of the first contact charging layer. The first contact charging layer includes a first material that has a first rating on a triboelectric series. The first contact charging layer has a thickness sufficiently thin so that a positive excess charge on the second side induces an electric field that induces negative charge carriers to form in the first conductive electrode layer. The second contact charging layer has a first side and an opposite second side. The second conductive electrode layer is disposed on the first side of the second contact charging layer. The second contact charging layer includes a second material that his a second rating on the triboelectric series wherein the second rating is more negative than the first rating. The second side of the second contact charging layer is disposed against the second side of the first contact charging layer. The second contact charging layer has a thickness sufficiently thin so that a negative excess charge on the second side induces an electric field that induces positive charge carriers to form in the second conductive electrode layer. Relative movement between contacting portions of the second side of the first contact charging layer and the second side of the second contact charging layer results in excess positive charge on the second side of the first contact charging layer and excess negative charge on the second side of the second contact charging layer.

In yet another aspect, the invention is a method of generating an electrical current and voltage in which a first contact charging layer is brought in contact with a second contact charging layer. The first contact charging layer has a first side and an opposite second side. A first conductive electrode layer is disposed on the first side of the first contact charging layer. The first contact charging layer includes a first material that has a first rating on a triboelectric series. The first contact charging layer has a thickness sufficiently thin so that a positive excess charge on the second side induces an electric field that induces negative charge carriers to form in the first conductive electrode layer. The second contact charging layer has a first side and an opposite second side. A second conductive electrode layer is disposed on the first side of the second contact charging layer. The second contact charging layer includes a second material that his a second rating on the triboelectric series wherein the second rating is more negative than the first rating. The second side of the second contact charging layer is disposed against the second side of the first contact charging layer. The second contact charging layer has a thickness sufficiently thin so that a negative excess charge on the second side induces an electric field that induces positive charge carriers to form in the second conductive electrode layer. Relative motion between the first contact charging layer and the second contact charging layer is caused. A load is applied between the first conductive electrode layer and the second electrode layer, thereby causing an electrical current to flow through the load.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

FIGS. 3A-3E is a plurality of schematic views showing a pressing-releasing sequence. of one embodiment.

FIG. 3F is a graph demonstrating voltage relationships during the sequence shown in FIGS. 3A-3E.

FIG. 3G is a graph demonstrating current relationships during the sequence shown in FIGS. 3A-3E.

FIGS. 4A-4E is a plurality of schematic views showing a method of making an embodiment with a textured surface.

FIG. 5 is schematic diagram of an embodiment according to FIGS. 4A-4E.

FIGS. 6A-6B are schematic views of alternate textures.

FIG. 7 is schematic diagram of an embodiment employing a surface textured with nanowires.

DETAILED DESCRIPTION OF THE INVENTION

Figure 1:
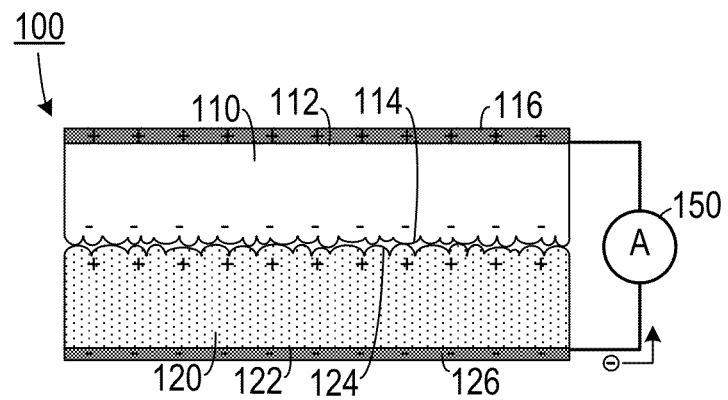
FIG. 1 is a schematic diagram of one representational embodiment.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, a triboelectric energy harvesting system may be embodied as a generator or a sensor unit 100 that includes a first contact charging layer 110 that has a first conductive electrode layer 116 disposed on a first side 112 and that has an opposite second side 114 that has a textured surface. The first contact charging layer 110 includes a material with a relatively less negative triboelectric series rating. Examples of suitable materials can include: polyethylene terephthalate (PET), poly(methyl methacrylate) (PMMA), a conductor, a metal, an alloy and combinations thereof.

A second contact charging layer 120 is disposed against the first contact charging layer 110. The second contact charging layer 120 includes a material that has a rating on the triboelectric series that is more negative than that of the material of the first contact charging layer 110. Examples of such materials can, for example, include poly-oxydiphenylene-pyromellitimide (such as Kapton), polydimethylsiloxane, a conductor, a metal, an alloy and combinations thereof. The second contact charging layer 120 includes a first side 122 and an opposite second side 124 and a second conductive electrode layer 126 is applied to the first side 122. The second side 124 also includes a textured surface. In one embodiment, the textured surfaces may include nanoscale or microscale texture. The electrode layers 116 and 126 can include materials such as gold, silver, aluminum, a metal, indium tin oxide (ITO), and combinations thereof. If ITO is used, the resulting device can be transparent.

Relative movement between the second sides 114 and 124 of the first contact charging layer 110 and the second contact charging layer 120 can be caused by applying a force to one of the layers. This causes electrons to be transferred from the second contact charging layer 120 to the first contact charging layer 110. This causes the second surface 114 of the first contact charging layer 110 to be negatively charged and the second surface 124 of the second contact charging layer 120 to be positively charged. The charges on the second sides 114 and 124 generate respective electric fields that induce charge accumulation in the electrode layers 116 and 126 and when a load 150 is coupled therebetween, electrons will flow through the load 150.

A unit 100 can be made as a sandwiched structure with two different polymer sheets stacked alternatively without interlayer binding. In one experimental embodiment, a rectangular (4.5 cm×1.2 cm) Kapton film (125 µm in thickness, Dupont 500HN) was placed onto another flexible PET substrate (Dura-Lar, 220 µm in thickness). The two short edges of the device were sealed with ordinary adhesive tape and to ensure an adequate contact between two polymer sheets. Both of the top and bottom surfaces of the structure were covered with a thin layer of Au alloy film (100 nm in thickness) by sputter coating. The metal films play two important roles here: (1) producing equal but opposite sign mobile charges via the electrostatic induction of the tribology generated potential at the interfacial region; and (2) serving as common electrodes for directly connecting the device with an external circuit.

Figure 2:
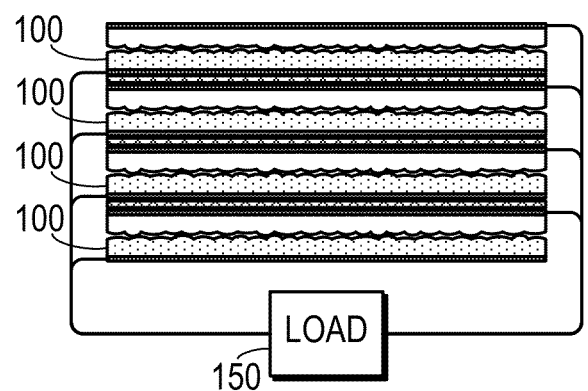
FIG. 2 is a schematic diagram of several generating units stacked and coupled in series.

As shown in FIG. 2, a plurality of units 100 can be stacked and coupled in parallel to generate an increased current, or in series to generate an increased voltage. By stacking two thin polymer films, for example Kapton and polyester (PET), a charge generation, separation and induction process can be achieved through a mechanical deformation of the polymer film. In one experimental embodiment, a power output density of about 10.4 mW/cm$^3$ was achieved with an output voltage of 3.3 V. This is a simple, low-cost, readily scalable fabrication process of a generator or sensor can convert random mechanical energy found in many environmental sources (e.g., rotating tires, wind, etc.) into electricity using conventional flexible/foldable polymer materials. This technology has a great potential for scaling up to power mobile and personal electronics used in environmental monitoring, personal medical networks, electronic emergency equipment and other self-powered systems.

The operating principle of the system can be described by the coupling of contact charging and electrostatic induction, as shown in FIG. 3A-3G in an embodiment in which the first contact charging layer comprises a Kapton film and the second contact charging layer comprises PMMA. In FIG. 3A, at the original state, no charge is generated or induced, and no electric potential difference (EPD) exists between the two electrodes. When an externally introduced displacement is applied to the unit 110 in the direction of the arrows, as shown in FIG. 3B, the two contact charging layers are brought into contact with each other. Surface charge transfer then takes place at the contact area due to triboelectric effect. According to the triboelectric series, electrons are injected from PMMA into Kapton, resulting in net negative charges at the Kapton surface and net positive charges at the PMMA surface, respectively. The insulating property of theses polymers allows a long-time retention of triboelectric charges for hours or even days.

As the displacement decreases, the unit 100 starts to be released and the Kapton film begins to revert back to its original position due to its own resilience. Once the two polymers separate, an EPD is then established between the two electrodes, as shown in FIG. 3C. Defining electric potential of the bottom electrode ($U_{BE}$) to be zero, electric potential of the top electrode ($U_{TE}$) can be calculated by:

$$U_{TE} = -\frac{\sigma d'}{\varepsilon_0} \quad (1)$$

where σ is the triboelectric charge density, $\varepsilon_o$ is the vacuum permittivity, and d' the interlayer distance at a given state.

Here, a forward connection is defined for measurement as a configuration with positive end of the electrometer 150 connected to the bottom electrode (BE). (All electric measurements herein are based on the forward connection unless otherwise stated.) Therefore, as the unit 100 is being released, $V_{oc}$ (as shown in FIG. 3F) keeps increasing until reaching the maximum value when the Kapton film fully reverts to the original position, as shown in FIG. 3D. Theoretically, such a voltage would remain constant provided that the input impedance of the electrometer is infinite. If renewed pressing is immediately followed, as shown in FIG. 3E, the EPD starts diminishing as the two polymer layers get closer to each other. As a result, $V_{oc}$ drops from the maximum value to zero when a full contact is made again between the two polymers, as shown in FIG. 3F.

As shown in FIG. 3G, if the two electrodes are shorted, any established EPD shown in Equation (1) as the two polymers separate drives electrons from the top electrode (TE) to the bottom electrode (BE), resulting in a nearly instantaneous positive current during the releasing process. The net effect is that inducted charges accumulate with positive sign on the TE and negative sign on the BE. The induced charge density (σ') when the generator is fully released can be expressed as below:

$$\sigma' = \frac{\sigma d' \varepsilon_{rk} \varepsilon_{rp}}{d_1 \varepsilon_{rp} + d' \varepsilon_{rk} \varepsilon_{rp} + d_2 \varepsilon_{rk}} \quad (2)$$

where $\varepsilon_{rk}$, and $\varepsilon_{rp}$ are the relative permittivity of Kapton and PMMA, respectively, $d_1$ and $d_2$ are the thickness of the Kapton film and the PMMA layer.

Once the unit 100 is pressed again, reduction of the interlayer distance makes the TE possess a higher electric potential than the BE. As a consequence, electrons are driven from the BE back to the TE, reducing the amount of inducted charges. This process corresponds to the nearly instantaneous negative current shown in FIG. 3G. When the two polymers are in contact again, as shown in FIG. 3B, all inducted charges are neutralized.

In one experimental embodiment, as triggered by a vibration source with controlled frequency and amplitude, the unit 100 produced an open-circuit voltage and a short-circuit current as predicted in the above analytical model. Electric output with opposite sign was obtained by switching the polarity for electric measurement. The peak value of the $V_{oc}$ and $I_{sc}$ were up to 110 V and 6 μA, respectively. Substituting the experimentally determined $V_{oc}$ into Equation (1), a theoretical triboelectric charge density was obtained according to the following:

$$\sigma = \frac{V_{oc}\varepsilon_0}{d_3} = 97.39 \; \mu C/m^2 \quad (3)$$

Then based on Equation (2), the maximum induced charge density ($\sigma'_{max}$) was theoretically calculated to be:

$$\sigma'_{max} = \frac{\sigma d_3 \varepsilon_{rk} \varepsilon_{rp}}{d_1 \varepsilon_{rp} + d_3 \varepsilon_{rk} \varepsilon_{rp} + d_2 \varepsilon_{rk}} = 73.72 \; \mu C/m^2 \quad (4)$$

Therefore, electrons are pumped back and forth between the two electrodes as a result of contact charging and electrostatic induction. For one cycle of contacting-sliding-separating the integration of current over time for releasing has the same value as that for pressing, indicating that equal amount of electrons flow in the opposite direction. The current peak corresponding to releasing has a smaller magnitude but lasts longer than that for pressing. Such an observation can be explained by the fact that pressing is caused by the external vibration source while it is the resilience of the Kapton film that leads to releasing. Therefore, it is likely that releasing corresponds to a slower process and thus a smaller but wider current signal. Having the maximum induced charge (Q'), the corresponding charge density was obtained as:

$$\sigma'_{max} = \frac{Q}{S} = 87.23 \; \mu C/m^2 \quad (6)$$

where S is the electrode area. The experimental result in Equation (6) is only slightly larger than the theoretically calculated one in Equation (4), indicating that the model is fairly valid for explaining the working principle.

External load matching for the generator was studied in the experimental embodiment. With an increase in the load resistance, the maximum current decreases due to ohmic loss, while the maximum voltage across the load has an opposite trend. Accordingly, the electric power exhibited an instantaneous peak value of 110 μW, in correspondence to a power density of 31.2 mW/cm³. The measurement results reveal that the generator is particularly efficient provided that the load has a resistance on the order of mega ohms.

One embodiment can be employed in a sensor system, such as a self-powered touch screen. To make the device transparent and improve the power generation density, three approaches were used in an experimental embodiment: (1) using a transparent PDMS film as one of the contact charging layers; (2) using transparent ITO for the electrode layers, resulting in a flexible and transparent structure; and (3) fabricating various PDMS pattern arrays to enhance the friction effect, resulting in a high-output generator unit.

Such an embodiment can be made of two sheets of polymers that have distinctly different triboelectric characteristics, with one easy to gain electrons and the other one easy to lose electrons. By stacking the two sheets together with flexibility of relative sliding, two insulating polymeric materials are touched and rubbed with each other when deformed by an external mechanical deformation. Thus, electrostatic charges with opposite signs are generated and distributed on the two surfaces of the polymer films due to the presence of the nanometer scale roughness, and an interface dipole layer is formed, which is called a triboelectric potential layer. Such a dipole layer induces an inner potential layer between the planar metal electrodes. The induced charges will not be quickly conducted away or neutralized owing to the insulative nature of the polymer films. To minimize the energy created by the triboelectric potential, electrostatically induced free-charges will flow across the external load between the two electrodes coated on the top and bottom polymer sheets, respectively, to reach equilibrium. Once the structure is released and the tribologic force is removed, the two polymer films recover their original shapes, and the tribologically generated positive and negative charges may neutralize, and the electrostatic induced charges across the two electrodes recombine.

As shown in FIGS. 4A-4E, patterns can be fabricated on the polymer surfaces to increase the triboelectric power output. To make patterned polydimethylsiloxane (PDMS) films, Si wafer molds 210 are fabricated by traditional photolithography methods, followed by a dry or wet etching process to fabricate different recessed features 212 onto the surface, as shown in FIG. 4A. Examples of such features include pyramids 216, rectangular prisms 226 (as shown in FIG. 6A) and rows 236 (as shown in FIG. 6B). The surface of the molds is initially treated with trimethylchlorosilane to prevent the PDMS film from sticking to the recessed features 212. As shown in FIG. 4B, liquid PDMS elastomer and a cross-linker are mixed, degassed and uniformly spin-coated on the surface of the mold 210. As shown in FIG. 4C, after curing thermally, a uniform PDMS layer 214 is peeled off, including inverse 216 of the original pattern features 212 on the surface of the mold 210. As shown in FIG. 4D, the PDMS film was fixed on the insulation surface of a clean indium tin oxide (ITO)-coated 219 polyethylene terephthalate (PET) substrate 217 by a thin PDMS bonding layer, and then the entire structure was covered with another ITO-coated 215 PET film 213 to form a sandwich-structured device. A schematic view of the resulting structure is shown in FIG. 5.

One advantage of this technique is that hundreds of replicas of patterned PDMS films can be produced from one single mold. Silicon-based molds can be replaced by metal molds (e.g., Ni or Al) due to their excellent mechanical properties and longevity. The entire preparation process of the device is simple and low-cost, making it possible to be scaled-up for large-scale production and practical applications.

Figure 8A:
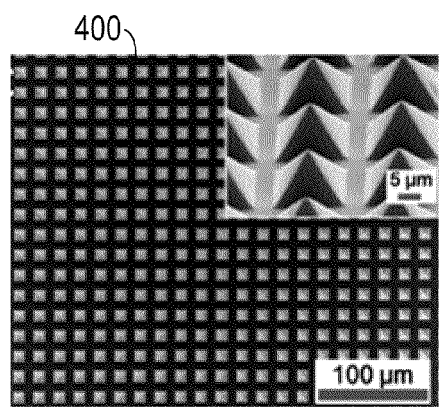
FIG. 8A is a micrograph of a contact charging layer having a surface with a pyramidal texture.
Figure 8B:
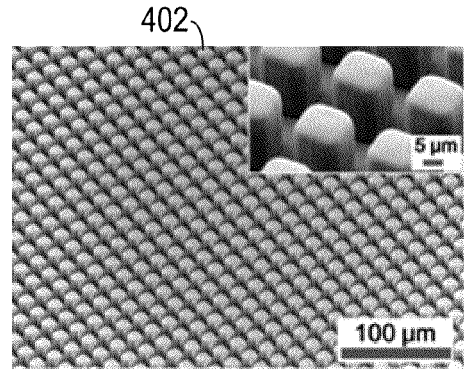
FIG. 8B is a micrograph of a contact charging layer having a surface with a rectangular prism texture.
Figure 8C:
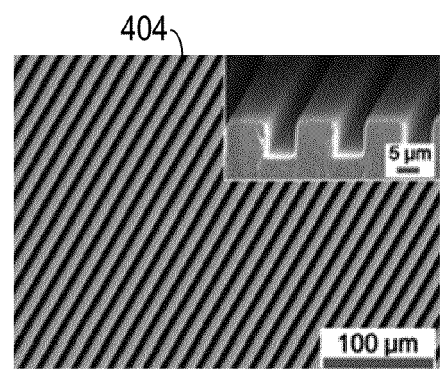
FIG. 8C is a micrograph of a contact charging layer having a surface with a row texture.

As shown in FIGS. 8A-8C, micrographs of the resulting PDMS pattern arrays show that the above-described fabrication method yields regular and uniform microstructures across the whole area of a 4-inch wafer mold. The shape and lateral dimensions of the polymer structure are well controlled by the initial patterns on the surface of the wafer mold. As shown in FIGS. 8A-8C, the size of single PDMS features is limited to about 10 µm. Smaller features down to 5 µm can also be produced with consistent quality. As shown in FIG. 8A, the pyramid features 400 have a near perfect geometric structure and a sharp tip, which can be beneficial for increasing the friction area and the efficiency in the power generation process. A micrograph of a rectangular prismatic embodiment 402 is shown in FIG. 8B and an embodiment employing elongated rows 404 is shown in FIG. 8C.

It should also be noted that the resulting PDMS film is stretchable and transparent, as illustrated in FIG. 2D. Given that the electrode layers include transparent ITO, these embodiments are especially applicable to touch sensors, such as touch screen displays.

As shown in FIG. 7, one embodiment includes a triboelectric generator 300 wherein a side of one of the contact charging layers 310 includes a texture formed by a plurality of elongated nanowires 312 extending outwardly therefrom. This embodiment can result in a substantial charge density during use.

Dry etching is applied on the Kapton surface 310 to create vertically aligned polymer nanowires 312. Use of these nanowires 312 results in increased surface friction as they are brought in contact with the opposite polymer layer 328. A spacer structure 326 improves electric output.

In one experimental embodiment, the fabrication process starts with a square glass sheet 320, on which is deposited with a thin layer of aluminum 322 as the bottom electrode using electron beam evaporator. Then a thin layer of PMMA 324 is spun-coated, followed by adding a spacer layer 326 at the edges, leaving a square cavity 328 at the center. One side of a Kapton film 310 is deposited with a layer of aluminum as the top electrode 311, while the other side was dry-etched to create vertically aligned polymer nanowires 312. Then the Kapton layer 310 was anchored on the spacer 326 with the top electrode 311 facing up. The spacer 326 can be made of an insulating polymer with double-sided adhesive, keeping the Kapton film 310 at a fixed distance away from the PMMA layer 324 underneath.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A generator, comprising:
 (a) a thin first contact charging layer including a first material that has a first rating on a triboelectric series, the thin first contact charging layer having a first side with a first conductive electrode layer applied thereto and an opposite second side;
 (b) a thin second contact charging layer including a second material that has a second rating on a triboelectric series that is more negative than the first rating, the thin second contact charging layer having a first side with a second conductive electrode layer applied thereto and an opposite second side, the thin second contact charging layer disposed adjacent to the first contact charging layer so that the second side of the second contact charging layer is in contact with the second side of the first contact charging layer; and
 (c) a plurality of spaced apart shapes, each having a maximum length of 10 µm, extending outwardly from at least a selected one of the second side of the first contact charging layer and the second side of the second contact charging layer.

2. The generator of claim 1, wherein the first contact charging layer comprises a material selected from a list consisting of: polyethylene terephthalate, poly(methyl methacrylate), a conductor, a metal, an alloy and combinations thereof.

3. The generator of claim 1, wherein the second contact charging layer comprises a material selected from a list consisting of: poly-oxydiphenylene-pyromellitimide, polydimethylsiloxane, a conductor, a metal, an alloy and combinations thereof.

4. The generator of claim 1, wherein the first conductive electrode layer and the second conductive electrode layer each comprise a material selected from a list consisting of: gold, silver, aluminum, a metal, indium tin oxide, and combinations thereof.

5. The generator of claim 1, wherein the plurality of spaced apart shapes includes a molded texture.

6. The generator of claim 5, wherein the molded texture comprises a texture that includes a plurality of evenly spaced shapes selected from a list consisting of: pyramids, rectangular prisms, rows and combinations thereof.

7. The generator of claim 1, wherein the plurality of spaced apart shapes includes a plurality of elongated vertically aligned nanowires extending outwardly therefrom.

8. A triboelectric generator, comprising:
   (a) a first conductive electrode layer;
   (b) a first contact charging layer having a first side and an opposite second side, the first conductive electrode layer disposed on the first side of the first contact charging layer, the first contact charging layer including a first material that has a first rating on a triboelectric series, the first contact charging layer having a thickness sufficiently thin so that a positive excess charge on the second side of the first contact charging layer induces an electric field that induces negative charge carriers to form in the first conductive electrode layer;
   (c) a second conductive electrode layer,
   (d) a second contact charging layer having a first side and an opposite second side, the second conductive electrode layer disposed on the first side of the second contact charging layer, the second contact charging layer including a second material that has a second rating on the triboelectric series wherein the second rating is more negative than the first rating, the second side of the second contact charging layer being disposed against the second side of the first contact charging layer, the second contact charging layer having a thickness sufficiently thin so that a negative excess charge on the second side of the second contact charging layer induces an electric field that induces positive charge carriers to form in the second conductive electrode layer; and
   (e) a plurality of spaced apart shapes, each having a maximum length of 10 μm, extending outwardly from at least a selected one of the second side of the first contact charging layer and the second side of the second contact charging layer, wherein relative movement between contacting portions of the second side of the first contact charging layer and the second side of the second contact charging layer results in excess positive charge on the second side of the first contact charging layer and excess negative charge on the second side of the second contact charging layer.

9. The triboelectric generator of claim 8, wherein the first contact charging layer comprises a material selected from a list consisting of: polyethylene terephthalate, poly(methyl methacrylate), a conductor, a metal, an alloy and combinations thereof.

10. The triboelectric generator of claim 8, wherein the second contact charging layer comprises a material selected from a list consisting of: poly-oxydiphenylene-pyromellitimide, polydimethylsiloxane, a conductor, a metal, an alloy and combinations thereof.

11. The triboelectric generator of claim 8, wherein the first conductive electrode and the second conductive electrode each comprise a material selected from a list consisting of: gold, silver, aluminum, a metal, indium tin oxide, and combinations thereof.

12. The triboelectric generator of claim 8, wherein-the plurality of spaced apart shapes includes a molded texture including a plurality of evenly spaced shapes selected from a list consisting of: pyramids, rectangular prisms, rows and combinations thereof.

13. The triboelectric generator of claim 8, wherein the plurality of spaced apart shapes includes a plurality of elongated vertically aligned nanowires extending outwardly therefrom.

* * * * *